United States Patent [19]

Matijević et al.

[11] Patent Number: 5,318,797
[45] Date of Patent: Jun. 7, 1994

[54] COATED PARTICLES, HOLLOW PARTICLES, AND PROCESS FOR MANUFACTURING THE SAME

[75] Inventors: Egon Matijević, Potsdam, N.Y.; Nobuo Kawahashi, Yokkaichi, Japan

[73] Assignees: Clarkson University, N.Y.; Japan Synthetic Rubber Co., Ltd., Japan

[21] Appl. No.: 540,930

[22] Filed: Jun. 20, 1990

[51] Int. Cl.$^5$ .................. B01J 13/02; B05D 7/24
[52] U.S. Cl. .................. 427/213.31; 427/222; 427/227; 523/204
[58] Field of Search .............. 427/213.3, 213.31, 212, 427/222, 227; 523/204, 223; 428/402; 419/37

[56] References Cited

U.S. PATENT DOCUMENTS

| | | | |
|---|---|---|---|
| 3,362,846 | 1/1968 | Lee | 427/215 |
| 3,437,515 | 4/1969 | Quinn et al. | 427/222 X |
| 3,528,809 | 9/1970 | Farnard et al. | 419/36 X |
| 3,792,136 | 2/1974 | Schmitt | 428/369 |
| 3,826,670 | 7/1974 | Rees | 427/213.3 X |
| 4,013,461 | 3/1977 | Elbert | 75/212 |
| 4,508,780 | 4/1985 | Sirinyan et al. | 427/212 X |
| 4,632,951 | 12/1986 | Fuhr et al. | 427/212 X |
| 4,670,303 | 6/1987 | Miles | 427/213.31 |
| 4,775,598 | 10/1988 | Jaeckel | 427/227 X |
| 4,798,691 | 1/1989 | Kasai et al. | 428/402.22 X |
| 5,039,559 | 8/1991 | Sang et al. | 427/213.3 |

FOREIGN PATENT DOCUMENTS

| | | | |
|---|---|---|---|
| 0107101 | 5/1984 | European Pat. Off. | |
| 155100 | 9/1982 | Japan | 427/222 |
| 068801 | 4/1986 | Japan | 427/212 |
| 2001307 | 5/1990 | Japan | |

OTHER PUBLICATIONS

J. Aerosol Sci., 19, No. 7, 939 (1988).
J. Aerosol Sci., 19, 511 (1988).
J. Aerosol Sci., 18, 175 (1987).
J. Am. Ceram. Soc., 71, No. 10, 845. (1988).
J. Colloid Interface Sci., 126, 645 (1988).
J. Colloid Interface Sci., 126, 243 (1988).
J. Mater. Sci., 25, 1886 (1990).
Adv. Ceram. Mater., 2, 798 (1987).
Langmuir, 4, 38 (1988).

*Primary Examiner*—Robert L. Stoll
*Assistant Examiner*—John M. Covert
*Attorney, Agent, or Firm*—Oliff & Berridge

[57] ABSTRACT

Spherical particles include a core of a polymer and a metal compound covering the polymer core. These particles may be formed by homogeneously dispersing particles of a polymeric compound in an aqueous solution of a hydrolyzable metal salt to form a uniform metal layer around the spherical particles. The spherical particles can also include a core of carbon and a metal compound covering the carbon core or the particles can have a hollow core prepared by heating spherical polymer particles coated with a metal compound to a temperature of 150° C. or higher in the presence of oxygen to completely decompose the polymeric compound. These spherical particles are useful in electronic materials, magnetic materials and the like.

14 Claims, 1 Drawing Sheet

Polystyrene latex particles coated with Y(OH)CO$_3$ according to procedure described in Example 2-1.

Figure 1. Polystyrene latex particles coated with Y(OH)CO$_3$ according to procedure described in Example 2-1.

COATED PARTICLES, HOLLOW PARTICLES, AND PROCESS FOR MANUFACTURING THE SAME

BACKGROUND OF THE INVENTION

1. Field of the Invention

This invention relates to spherical particles comprising a core of a polymer and a metal compound covering the polymer core (hereinafter referred to as polymer-metal compound coated spherical particles), spherical particles comprising a core of carbon and a metal compound covering the carbon core (hereinafter referred to as carbon-metal compound coated spherical particles), as well as to spherical hollow particles of a metal compound; and processes for producing such particles. The polymer-metal compound coated spherical particles are useful as standard particles, carrier particles used for diagnostic purposes, lubrication materials, electro-optical, and the like. The carbon-metal compound coated spherical particles and the hollow particles are useful as electronic materials, magnetic materials, and the like.

2. Description of the Background Art

Spherical particles of styrene-containing polymers having a narrow particle size distribution are known as useful as standard particles, and carrier particles used for diagnostic purposes exhibit poor heat resistance. When used as standard particles or lubrication materials, they are apt to deform or destruct under conditions of a large shear or a high temperature, thus failing to exhibit their intrinsic characteristics. The applications of these particles, therefore, are very limited.

In order to overcome these drawbacks, the use of highly crosslinked materials produced by the copolymerization of crosslinked monomers has been proposed. Such materials, however, do not lead to a solution of the problems so long as they are organic polymer compounds.

Applications of these spherical particles of polymeric compounds to diagnostic or medical purposes have also limitations because of their poor affinity for antigens and antibodies or inadequate compatibility to living bodies.

On the other hand, there are a wide variety of applications of ceramic particles as electronic-, magnetic-, and heat resistant materials, and many kinds of metal compound particles are being used in these area. In order to accommodate diversified applications and increasing requirements in their performances, many types of composite particles have been proposed. One of the examples refers to coated particles of iron oxide covered with a silicon compound. Deformation of particles and sintering between particles can be avoided when needle-like magnetic particles are produced by a heat treatment. Another example is iron powder covered with copper in an attempt to increase the strength of iron as a metallurgic powder material. Composite particles of yellow iron oxide with a coating of antimony oxide or aluminum oxide having improved heat resistance have also been reported.

All these particles are composites where the core and the coating are metal compounds. In view of the ever more sophisticated demands on properties in the field of electronics, new materials are in great demand.

Particularly interesting in ceramic applications are recently reported hollow particles of metal compounds. For example, C. Roth et al. described hollow particles, prepared from $CuSO_4.5H_2O$ particles by the aerosol method. They claim that when $CuSO_4.5H_2O$ particles are heated and dried, the pentahydrate ultimately becomes monohydrate, from which gaseous $SO_2$ or $SO_3$ is emitted, thus producing holes in the particles [*J. Aerosol Sci.*, 19, No. 7, 939 (1988)]. However, no experimental evidence was presented to show that the particles have an intact hollow space. Durand-Keklikian et al. [*J. Aerosol Sci.*, 19, 511 (1988)] also reported hollow particle preparation by the aerosol method. Since the method employs drying and emission of dodecane from inside the particles, a number of particles are destroyed and thus do not necessarily have intact holes.

Similarly, a study by Ramanurthi [*J. Aerosol Sci.*, 18, 175 (1987)] on particles from $CuSO_4.5H_2O$ prepared by the aerosol method provided no more advanced results than the study by C. Roth et al.

The aerosol method of preparing the particles, inside of which empty spaces are to be produced by heating and drying, cannot yield particles of a narrow size distribution. In addition, the method is inappropriate for producing small size particles (1 $\mu$m or smaller) or large size particles (5 $\mu$m or larger). Thus, the aerosol method has serious limitation with respect to production of well defined hollow spheres.

The experimental data on yttrium compound particles reported by Matijevic' et al. [*J. Am. Ceram. Soc.*, 71 No. 10, 845 (1988)] cannot be considered to consist of particles having intact holes.

As mentioned above, although spherical particles of high molecular weight copolymers, having a narrow size distribution, used as standard particles, carrier particles for diagnostic purposes, and the like exhibit excellent performances, they are not only inferior in such characteristics as heat resistance, strength, light resistance, and wear resistance, but also their surfaces have poor affinity for antigens and antibodies and they present inadequate compatibility to living bodies. Composite particles with a metal compound layer covering the polymer cores are, therefore, highly desirable and useful.

Composite particles comprising both electrically conductive and nonconductive portions are needed in ceramics as electronic, magnetic, optical materials, and the like.

As outlined above, metal compound particles having intact hollow spaces therein and a desired particle size distribution have not been obtained as yet. The control of the particle size has also been difficult. The conventionally known technology for producing hollow metal compound particles relies on the aerosol method, which is hard to control in terms of the product quality and gives only a poor yield. The scale-up of the aerosol process to a commercial unit has been extremely difficult.

SUMMARY OF THE INVENTION

An object of the present invention is to provide polymer-metal compound coated spherical particles, carbon-metal compound coated spherical particles, and spherical hollow particles of a metal compound having improved quality, a narrow size distribution, and desired particle sizes.

A specific object of the present invention is to provide spherical polymer-metal compound composite particles comprising (a) a core of a polymeric compound, and (b) a shell of a metal compound covering the polymeric compound core, which particles having an outer diameter of 0.07 to 30 μm and a ratio of the core diameter to the outer diameter of 0.40 to 0.95 and being produced by homogeneously dispersing particles of said polymer compounds in an aqueous solution of a hydrolyzable metal salt. Inorganic shell that coats the particles may consist, among others, of yttrium, zirconium, aluminum, and chromium compounds.

Another object of the present invention is to provide spherical carbon-metal compound composite particles comprising (a) a carbon core, and (b) a shell of a metal compound covering the carbon core, which particles having an outer diameter of 0.05 to 20 μm and a ratio of the core diameter to the outer diameter of 0.30 to 0.93. The shell may consist of yttrium, aluminum, zirconium, and chromium compounds.

The present invention also provides a process for manufacturing said spherical carbon-metal compound coated particles by heating spherical polymer-metal compound coated particles at a temperature of 150° C. or higher under an inert gas atmosphere, thus decomposing the polymeric compound of the core into carbon.

In an embodiment of the present invention, when said heating of the spherical polymer-metal compound coated particles is carried out at 150° C. or a higher temperature in the presence of oxygen, the polymeric compound of the core is completely decomposed into gases and emitted outside the shell, producing spherical hollow particles of a metal compound having an outer diameter of 0.04 to 15 μm and a ratio of the hollow space diameter to the outer diameter of 0.30 to 0.93.

It is still another object of the present invention to provide such spherical hollow particles and a process for producing the same.

Other objects, features and advantages of the invention will hereinafter become more readily apparent from the following description.

DETAILED DESCRIPTION OF THE INVENTION AND PREFERRED EMBODIMENTS

Polymer Core Particles Coated with an Inorganic Shell

The composite particles of the present invention have a great significance as improved monodispersed polymers. There are no specific restrictions as to polymeric compounds used as the core. When the composite particles should have excellent durability, wear resistance, heat resistance, and the like characteristics, the use of the polymeric compounds having an weight average molecular weight of 5,000 or more, preferably 50,000 or more, is desirable. If necessary, crosslinking monomers can be used when the polymer to be used as the core is polymerized. It is also possible to use a high molecular weight polymer having a weight average molecular weight of 1,000,000 or more.

From the aspect of the heat resistance and wear resistance of the resulting composite particles, it is desirable the glass transition temperature (Tg) of the polymeric compounds to be 80° C. or higher, and preferably 90° C. or higher.

There are no specific limitations as to the types and compositions of the polymeric compounds. In order to obtain composite particles having good durability and heat resistance, the use of compositions containing styrene copolymer, methylmethacrylate copolymer, divinylbenzene copolymer, or vinylidene chloride copolymer as major components is desirable. Especially preferable copolymers are styrene copolymer and methylmethacrylate copolymer. As the above-mentioned crosslinking monomers, divinylbenzene, ethyleneglycol dimethacrylate, trimethylolpropane trimethacrylate, and the like can be used. Divinylbenzene is particularly preferable from the aspect of wear resistance and strength.

The characteristics of the coated particles can be varied depending on the type and the composition of metal compounds used as the shell. When higher wear resistance and heat resistance are needed, the use of zirconium compounds, aluminum compounds, chromium compounds, or yttrium compounds are desirable. Oxides of these metals are especially preferable. Specific examples include $Al_2O_3$, $Y_2O_3$, and the like. When optical characteristics of the coated particles are of interest, for example, when particles having a shielding effect are desired, metal oxides of different refractive index can be used. When the coated particles are to be used for medical diagnostics or other medical purposes, the use of these shell compounds might be preferable in view of their good affinity with living bodies.

For preparing the polymer-metal compound spherical particles of the present invention, a method is employed, in which a uniform covering of the metal compound is produced on the surfaces of the polymer by heating and hydrolyzing a hydrolyzable metal salt solution.

Depending on the type of the compound to be hydrolyzed, either one of the following methods can be employed.

One of the methods involves the hydrolysis of a hydrolyzable metal salt. Since the reaction for producing composite particles can be carried out in an aqueous solution, the method is economical, efficient, and safe when adapted to commercial production. Nitrates, e.g. $Y(NO_3)_3$, chlorides, e.g. $YCl_3$, sulfates, e.g. $Zr(SO_4)_2$, and the like can be given as examples of hydrolyzable metal salts. They can easily be hydrolyzed at room temperature or at an elevated temperature, converted into simple oxides or composite hydroxides, e.g. $Y(OH)CO_3$, $Zr(OH)_4$, or the like, uniformly covering the surfaces of spherical polymeric compounds which constitute the cores of the spherical composite particles. By subsequent heat treatment, these coatings can be converted to corresponding oxides.

Preparations of coatings of aluminum, chromium, yttrium, and zirconium shells on inorganic cores have been reported before [*J. Colloid Interface Sci.*, 126, 645 (1988), *J. Colloid Interface Sci.*, 126, 243 (1988), *J. Mater. Sci.*, 25, 1886 (1990), *Adv. Ceram. Mater.*, 2, 798 (1987), *Langmuir*, 4, 38 (1988)], but no such procedure has been applied to polymer cores.

It is imperative in the above method to ensure homogeneous dispersion of polymeric compounds particles in aqueous solutions. If the dispersion is incomplete, leaving aggregates of several to several hundred particles in it, the covering of metal compounds occurs onto such aggregates. In order to overcome these problems, a water soluble polymeric compound or a surfactant can be used as a dispersing agent. Such a dispersing agent can be used in an amount of 1% by weight or more, preferably 3–300% by weight of the polymer, and most preferably 5–250% by weight of the polymeric compound particles which are to serve as cores. Polyvinyl pyrrolidone, polyvinyl alcohol, sodium polycarboxylate, sodium hexamethaphosphate, sodium naphthalenesulfonate, sodium dodecylbenzenesulfonate, sodium dodecylsulfate, and the like are given as examples of water soluble polymeric compounds or surfactants preferably used as dispersing agents. Of these, polyvinyl pyrrolidone and sodium dodecylsulfate are preferable. These dispersing agents can be used either independently or in combination of two or more species.

The polymer-metal compound coated spherical particles can be, in principle, obtained by two approaches. In the first method the hydrolyzed metal ion adsorbs onto the polymer core particle and polymerizes on its surface, followed by further incorporation of the hydrolyzed complexes to give shells of different thickness.

In the second method very finely dispersed metal compounds precipitate in the presence of the core particles, and then get attached to the latter by a heterocoagulation mechanism. Again, the thickness of the coated layer can be adjusted by the size and the number of adhered metal compound particles.

When this reaction is carried out at the isoelectric point of metal compound particles, cationic polymer particles as cores effectively attract the coating particles. Polymer particles with neutral surface can be used as cores, after being charged positively by addition of cationic water soluble polymers or surfactants. For example, for coating polystyrene with $Y(OH)CO_3$ composite particles, at the isoelectric point of $Y(OH)CO_3$ (~7.6), cationic polystyrene particles are a suitable core material.

Polymer-metal compound coated spherical particles thus prepared have a uniform covering layer and can be redispersed.

Spherical Particles Having a Carbon Core and an Inorganic Shell

Carbon-metal compound coated spherical particles and the method of their preparation is now discussed.

A feature of the composite particles is that they comprise a core of carbon and a metal compound shell covering the carbon core. Although such particles have heretofore been proposed, they have never been manufactured. The approach for the manufacture of such carbon-metal compound coated particles proposed in the past was to cover spherical carbon particles with a metal compound. Problems with this approach are as follows. Firstly, spherical carbon particles, which are normally very small in size and have a narrow size distribution, are difficult to manufacture. Secondly, carbon particles are very difficult to homogeneously disperse in a medium. In addition, carbon particles have such poor affinity for metal compounds, that they cannot be properly covered with metal compounds.

In order to solve these problems, the approach taken in the present invention is first to produce polymer-metal compound coated spherical particles and then to convert the polymer into carbon by heating under an inert gas atmosphere. Polymer-metal compound composite spherical particles prepared by the method discussed above have a uniform covering layer of a metal compound and exhibit very narrow size distribution (monodispersed particles). Carbon-metal compound coated spherical particles obtained by converting the polymer into carbon retain the same uniform metal compound covering layer which can exhibit the same degree of size uniformity.

No specific limitation is imposed on the four kinds of metal compounds used as the shell material. Depending on the purposes to which the carbon-metal compound particles are directed, yttrium compounds, zirconium compounds, aluminum compounds, chromium compounds, and the like can be used.

The temperature at which the polymer-metal compound coated particles are heated is dependent on the type of polymers, but the temperature must be at least 150° C., and preferably 300° C. or higher. Polymers cannot be converted into carbon at a temperature below 150° C. Besides the temperature, the atmosphere in which the polymer-metal compound coated particles are heated has also a great significance in the process for manufacturing carbon-metal compound coated spherical particles. Polymers can efficiently be converted into carbon in an inert gas atmosphere. If oxygen is present, carbon is successively converted into $CO_2$, thus preventing an efficient production of carbon-metal compound coated spherical particles. The use of crosslinked polymers is preferable in this respect, since they are slowly converted into carbon, resulting in a high content of residual carbon. The amount of crosslinking monomers in such crosslinked polymers is usually 0.5% by weight or more, and preferably 5% by weight or more. Among the crosslinking monomers previously exemplified, divinylbenzene is preferable for obtaining the carbon core at a high rate.

There are no specific limitations as to the monomer compositions which make up the polymeric compounds. From the aspect of a high carbon content rate, one of the monomers selected from styrene, methylmethacrylate, acrylonitrile, and butadiene is used, preferably in an amount of 20% by weight or more, as a major component.

Hollow Uniform Inorganic Particles

As previously described, hollow particles of metal compounds are known in the art. There have, however, been no such uniform hollow particles having specified particle size and a narrow size distribution as claimed in this invention. Nor have there been any processes described heretofore capable of controlling both the particle size and hollow sphere diameters in a specific range as defined in the appended claims of the present invention. Unavailability of such processes have been a stumbling block against commercialization of spherical hollow particles of metal compounds which have a big potential in numerous applications.

The spherical hollow particles of the present invention can be prepared from the polymer-metal compound coated spherical particles by heating them at a temperature of 150° C. or higher in the presence of air or oxygen to completely decompose the polymer core into gases and by emitting the gas through the shell. This process ensures a free control of the particle size, the hollow sphere diameter, and the size distribution of the resulting particles. The hollow particles have a shell layer which can exhibit superior uniformity.

The hollow particles of metal compounds of the present invention have the same usage as hollow organic particles which have already been known in the art (e.g. U.S. Pat. No. 4,798,691). They are used as microcapsules for medical purposes, a noncarbon paper material, an opaquing agent, a moisturizing agent, a shock absorbing material, and the like. In addition to these applications common to organic hollow particles, the metal compound hollow particles of the present invention can find utility in areas in which characteristics inherent to metal compounds or ceramics, such as high strength and superior heat and wear resistances, are required. Furthermore, the hollow particles of present invention may be provided with magnetic, optical, or other beneficial functions, which may further expand their potential utility as magnetic and electronic materials.

In the preparation of the hollow spherical particles, there are several types of polymeric compounds to be used as a core material which are to be decomposed into gases and emitted through the shell. For complete decomposition and emission, however, polymers not having crosslinked structure are preferable. Such polymers can readily decompose at a relatively low temperature within a short period of time, thus producing hollow space inside the shell. If crosslinking monomers are contained in the polymer components of the core polymeric compounds, heating at a temperature of 800° C. or higher, and in some cases 1,000° C. or higher, and a duration of 2 hours or more is required. The preferable monomers, from which the polymeric core compound are produced, are those capable of completely decomposing into carbon dioxide gas and water vapor (and in some cases nitrogen oxide gas) by heating. Considering this requirement and the cost, the polymers comprising one of the monomers selected from styrene, acrylonitrile, vinyl acetate, and the like, as a major component, are preferably used.

Heating at a temperature higher than 1,200° C. tends to produce cracks on the surface of hollow particles. Also, too rapid heating or cooling may cause fracture or cracking of the shell. A preferable rate of temperature rise is 30° C. per minute or less and a preferable cooling rate is 50° C. per minute or less.

Although there are no specific limitations as to the composition of the shell, the latter dominates the characteristics of the hollow spherical particles. The composition of the shell, therefore, should depend on the intended applications of the particle products. For example, metal compounds possessing opaqueness can be suitably used for the hollow particles directed to opaquing agents. Yttrium compounds exhibit outstanding wear resistance and, thus, the products made therefrom provide for good workability. Aluminum and zirconium compounds are appropriate for the products requiring high strength and heat resistance.

Other features of the invention will become apparent in the course of the following description of the embodiments in the examples, which are given for illustration of the invention and are not intended to be limiting thereof. In the examples below "% by weight" is described simply as "%".

EXAMPLES

Preparation of Spherical Polymer Particles

Example 1-1

Into a four-necked polymerization flask 576 g of distilled water, 0.5 g of Triton X-100 (trademark, nonionic surfactant manufactured by Rhom and Haas Corp.), and 0.5 g of 2,2′-azobis(2-methylpropionitrile) (AIBN: manufactured by Aldrich Co.) were charged and stirred for 10 minutes to completely dissolve Triton X-100 and AIBN. To the solution was added 100 g of styrene monomer and the mixture was stirred for 5 minutes while introducing nitrogen gas. The flask was then put into a water bath and the reaction was carried out at 70° C. for 12 hours, followed by cooling to room temperature. The resultant reaction mixture was filtered to separate agglomerated solids. A dispersion of spherical polymeric compound particles obtained as the filtrate contained 14.2% by weight of the total solid material. The particles were confirmed to have an average diameter of 0.17 μm by transmission electron microscopy. The glass transition temperature (Tg) of the spherical polymeric compound was found to be 101° C. and its weight average molecular weight was 95,000.

Distilled water was added to the dispersion of the spherical polymeric compound to achieve the polymer concentration of 1 g/l.

Example 1-2

Into a polymerization pressure vessel 570 g of distilled water, 0.25 g of Triton X-100, 0.25 g of sodium dodecylsulfate, and 0.5 g of sodium persulfate were charged and stirred for 10 minutes to effect complete dissolution. To the solution were successively added 85 g of methylmethacrylate monomer, 10 g of vinylidene chloride monomer, 3 g of acrylic acid monomer, and 2 g of divinylbenzene monomer and the mixture was stirred for 2 minutes during which nitrogen gas was introduced. The mixture was then heated to 80° C. and reacted for 12 hours, followed by cooling to room temperature. The resultant reaction mixture was filtered to separate agglomerated solids. A dispersion of spherical polymeric compound particles obtained as the filtrate contained 14.6% by weight of the total solid material. The particles were confirmed to have an average diameter of 0.14 μm by transmission electron microscopy. The glass transition temperature (Tg) of the spherical polymeric compound was found to be 108° C. and its weight average molecular weight was 130,000.

Distilled water was added to the dispersion of the spherical polymeric compound to achieve the polymer concentration of 1 g/l.

Example 1-3

A dispersion of the spherical polymeric compound was prepared in the same manner as in Example 1-1, except for using 0.5 g of sodium dodecylbenzenesulfonate as a surfactant, and 99 g of styrene and 1 g of divinylbenzene as monomers. The dispersion contained 14.1% by weight of the total solid material. The polymer particles were confirmed to have an average diameter of 0.25 μm. No glass transition temperature (Tg) of the polymer was found at temperatures below 150° C. and the polymer had a weight average molecular weight of 850,000.

Distilled water was added to the dispersion of the spherical polymeric compound to yield the polymer concentration of 1 g/l.

Example 1-4

A dispersion of the spherical polymeric compound was prepared in the same manner as in Example 1-1, except for a further addition of 8 g of bromotrichloromethane as a molecular weight modifier.

The dispersion contained 14.3% by weight of the total solid material. The polymer particles had an average diameter of 0.19 μm and a glass transition temperature (Tg) of 75° C. The polymer had a weight average molecular weight of 5,500.

Distilled water was added to the dispersion of the spherical polymeric compound to yield the polymer concentration of 1 g/l.

Example 1-5

Into a 1,000 ml four-necked polymerization flask were charged 70 g of the dispersion of the spherical polymeric compound prepared as described in Example 1-4, 929 g of distilled water, and 1.0 g of sodium persulfate, and the mixture was stirred for 10 minutes for complete dissolution. To this solution were added 90 g of styrene monomer and 10 g of divinylbenzene, and the mixture was stirred for 5 minutes during which the flask was purged with nitrogen gas. The flask was then put into a water bath and the reaction was carried out at 70° C. for 12 hours, followed by cooling to room temperature. The resultant reaction mixture was filtered in the same manner as in Example 1-1 to obtain a dispersion of spherical polymeric compound particles containing 9.6% by weight of total solid material. The polymer particles had an average diameter of 0.35 μm. No glass transition temperature (Tg) was confirmed at temperatures lower than 150° C. The polymer had a weight average molecular weight greater than 1,000,000.

Distilled water was added to the dispersion of the spherical polymeric compound to yield the polymer concentration of 1 g/l.

Example 1-6

A dispersion of the spherical polymeric compound was prepared in the same manner as in Example 1-5, except for using 80 g of divinylbenzene and 20 g of methylvinylbenzene as monomers. The dispersion contained 9.5% by weight of the total solid material. The polymer particles had an average diameter of 0.31 μm. No glass transition temperature (Tg) of the polymer was found at temperatures below 150° C. and the polymer had a weight average molecular weight of greater than 1,000,000.

Distilled water was added to the dispersion of the spherical polymeric compound to yield the polymer concentration of 1 g/l.

Example 1-7

Polystyrene particles STADEX SC-310-S (trademark, product of Japan Synthetic Rubber Co., Ltd.) having an average diameter of 3.1 μm were used as spherical polymeric compound particles. The polymer had a glass transition temperature (Tg) of 105° C. and a weight average molecular weight of 700,000.

Distilled water was added to the polymer particles to yield the polymer concentration of 1 g/l.

Example 1-8

Polystyrene/DVB No. 120 particles (trademark, product of Duke Scientific Corp.) having an average diameter of 20 μm were used as spherical polymeric compound particles. The polymer had a glass transition temperature (Tg) higher than 150° C. and a weight average molecular weight greater than 1,000,000.

Distilled water was added to the polymer particles to yield the polymer concentration of 1 g/l.

Example 1-9

A dispersion of the spherical polymeric compound was prepared in the same manner as in Example 1-1, except for using 0.5 g of sodium dodecylbenzenesulfonate as the surfactant, and 60 g of acrylonitrile, 35 g of styrene, 4 g of acrylic acid, and 1 g of divinylbenzene as monomers. The dispersion contained 14.2% by weight of the total solid material. The polymer particles had an average diameter of 0.41 μm. The glass transition temperature (Tg) of the polymer was 102° C. and the polymer had a weight average molecular weight of 750,000.

Distilled water was added to the dispersion of the spherical polymeric compound to yield the polymer concentration of 1 g/l.

Example 1-10

A dispersion of the spherical polymeric compound was prepared in the same manner as in Example 1-2, except for using 57 g of styrene, 40 g of butadiene, and 3 g of acrylic acid as monomers, and reacting for 24 hours. The dispersion contained 13.9% by weight of the total solid material. The polymer particles had an average diameter of 0.25 μm. The polymer had a glass transition temperature (Tg) of $-18°$ C. and a weight average molecular weight of 1,000,000.

Distilled water was added to the dispersion of the spherical polymeric compound to yield the polymer concentration of 1 g/l.

Preparation of Polymer-Metal Compound Coated Spherical Particles

Example 2-1

Into a 150 ml glass container with a lid, were charged 10 ml of the spherical polymer particle dispersion (concentration: 1 g/l), prepared as described in Example 1-1, 0.1 ml of a 3% aqueous solution of polyvinylpyrrolidone (weight average molecular weight: 360,000), 10 ml of a $5 \times 10^{-2}$ mol/l solution of yttrium nitrate which had been first filtered through a 0.2 μm pore size filter, 50 ml of a 3.6 mol/l solution of urea, and 29.9 ml of distilled water (see Note). After thoroughly stirring for 1 minute in an ultrasonic water bath, the mixture was hydrolyzed for 2 hours in a thermostat maintained at 90° C. After cooling to room temperature, the coated particles were settled by centrifugation. Distilled water was added to the precipitate obtained by removing the supernatant solution, followed by stirring the system in a ultrasonic water bath until the particles were fully dispersed. The procedure of the centrifugation, washing with water, and ultrasonic stirring was repeated 4 times, following which the particles were dried at room temperature.

The coated particles were observed in an transmission electron microscope and shown that they had an average particle size of 0.26 μm, a ratio of the core diameter to the outer diameter of 0.65, with their surfaces being completely covered with a uniform metal compound layer.

Figure 1:
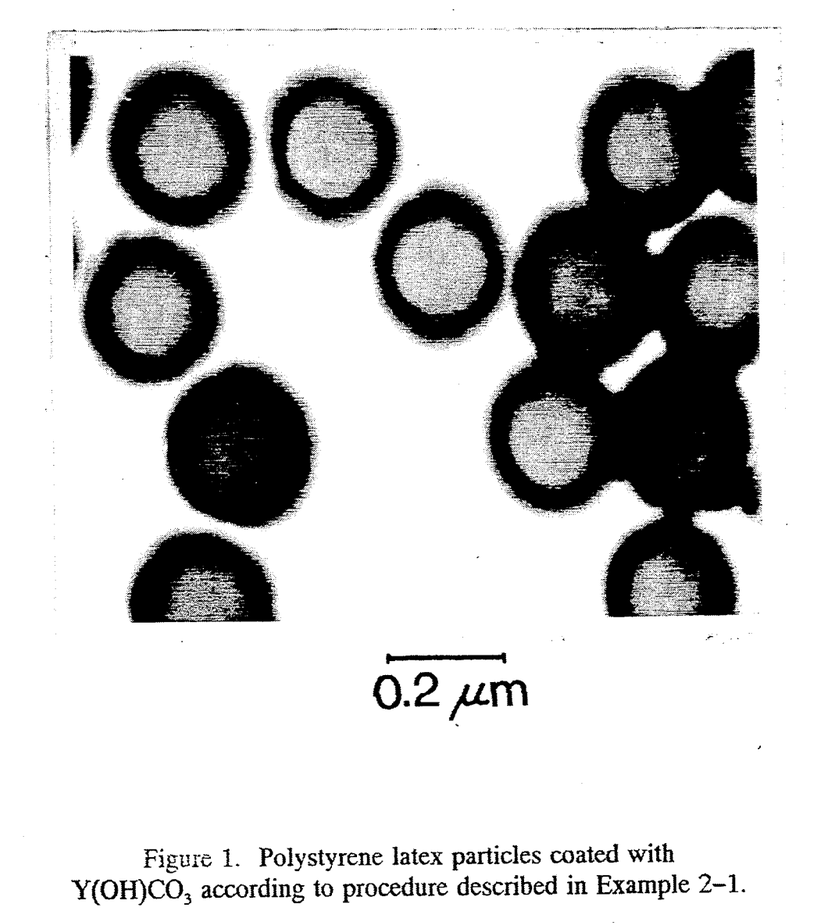
FIG. 1 is an electron micrograph of polystyrene latex particles coated with $Y(OH)CO_3$ according to the procedure described in Example 2-1.

As an example of coated particles electron micrograph (FIG. 1) shows a sample prepared according to Example 2-1.

IR, XRD, TGA, DTA, elemental, gas chromatography, and electrophoresis analyses confirmed that the product was composed of particles consisting of a styrene copolymer core and the $Y(OH)CO_3$ shell.

Note: The composition of the reactants was as follows:

| | |
|---|---|
| (1) Sytrene copolymer (described in Example 1-1) | 0.1 g/l |
| (2) Yttrium nitrate | $5.0 \times 10^{-3}$ mol/l |
| (3) Polyvinylpyrrolidone | 30 wt. %* |

-continued

| | |
|---|---|
| (M.W. 360,000) | |
| (4) Urea | 1.8 mol/l |

*Based on the weight of the styrene copolymer.

Example 2-2 to Example 2-13

Polymer-metal compound coated spherical particles of Examples 2-2 to Examples 2-13 were prepared in the same manner as in Example 2-1, except for using components and conditions listed in Table 1. The data obtained for the particles are also given in Table 1, in which the following abbreviations apply.
PVP: Polyvinylpyrrolidone
SDS: Sodium dodecylsulfate
DBS: Dodecylbenzenesulfonate
SPC: Sodium polycarboxylate
SHP: Sodium hexamethaphosphate
NSC: Naphthalenesulfonate condensate
MMA: Methylmethacrylate
PVA: Polyvinyl alcohol
VC: Vinylidene chloride
FA: Formaldehyde
BD: Butadiene
AN: Acrylonitrile
DVB: Divinylbenzene
m-EVB: Methylvinylbenzene

Example 2-14

Into a 150 ml glass container with a lid, were charged 10 ml of the spherical polymer particle dispersion (concentration: 1 g/l), prepared as described in Example 1-3, 1 ml of a 3% aqueous solution of polyvinyl alcohol (molecular weight: 2,500), 10 ml of a $5 \times 10^{-2}$ mol/l solution of zirconium sulfate filtered through a 0.2 $\mu$m filter in advance. 50 ml of a 2.0 mol/l solution of formamide, and 39 ml of distilled water. After thoroughly stirring for 1 minute in an ultrasonic water bath, the mixture was hydrolyzed for 2 hours in a thermostat which had been maintained at 70° C. After aging, the composite particles were settled by centrifugation. The result of the method is the same as in Example 2-1.

The resulting composite particles had an average particle size of 0.30 $\mu$m, a ratio of the core diameter to the outer diameter of 0.80, with their surfaces being completely covered with a uniform metal compound layer. This product was composed of particles consisting of a styrene-divinylbenzene copolymer core and a $Zr_2(OH)_6SO_4$ shell.

Example 2-15 to Example 2-19

Polymer-metal compound coated spherical particles of Example 2-15 to Example 2-19 were prepared in the same manner as in Example 2-14, except for using components and conditions listed in Table 1-3.

Example 2-20

20 ml of a solution containing 0.5 mol/l of $Al(NO_3)_3$, 0.25 mol/l of $Al_2(SO_4)_3$, and 2.5 mol/l of urea was heated at 100° C. for 2 hours. Subsequently, the solution was rapidly quenched to room temperature. Into a 150 ml glass container with a lid, were charged 20 ml of the spherical polymer particle dispersion (concentration: 1 g/l), prepared as described in Example 1-1, 0.2 ml of a 3% aqueous solution of polyvinylpyrrolidone (molecular weight: 360,000). 20 ml of a mixed aluminum salts solution prepared as described above, and 59.8 ml of distilled water. After thoroughly stirring for 1 minute in an ultrasonic water bath, the mixture was hydrolyzed for 30 minutes in a thermostat maintained at 25° C. After aging, the coated particles were settled by centrifugation. The rest of the method is the same as in Example 2-1.

The resulting coated particles had an average particle size of 0.28 $\mu$m, a ratio of the core diameter to the outer diameter of 0.61, with their surfaces being completely covered with a uniform metal compound layer. This product was composed of particles consisting of a styrene copolymer core and a $Al(OH)_3$ shell.

Example 2-21 to Example 2-22

Polymer-metal compound coated spherical particles of Examples 2-21 and 2-22 were prepared in the same manner as in Example 2-20, except for using components and conditions listed in Table 1-4.

Example 2-23

Chromium ion hydrolysis was induced by admixing KOH to the chrom alum coating solution in the molar ratio $[Cr^{3+}]/[OH^-] = 1$. In order to make the stock solution, to 800 ml of magnetically stirred doubly distilled water was added 20 ml of a 0.2 mol/l chrom alum solution, then dropwise 40 ml of a 0.1 mol/l KOH solution, and finally water to 1 l. After 12 hours, this solution was filtered through a 0.2 $\mu$m filter.

Into a 150 ml glass container with a lid, were charged 20 ml of the spherical polymer particle dispersion (concentration: 1 g/l), 1 ml of a 3% aqueous solution of polyvinylpyrrolidone (molecular weight: 360,000), prepared as described in Example 1-6, 25 ml of a $4 \times 10^{-3}$ mol/l stock solution of chrom alum, and 54 ml of distilled water. After stirring for 1 minute in an ultrasonic water bath, the mixture was hydrolyzed for 6 hours in a thermostat which had been maintained at 85° C. After aging, the composite particles were settled by centrifugation. The rest of the method was the same as in Example 2-1, except for using components and conditions listed in Table 1-4. The resulting coated particles had an average particle size of 0.4 $\mu$m, a ratio of the core diameter to the outer diameter of 0.78, with their surface being completely covered with a uniform metal compound lyaer. This product was composed of particles consisting of a styrene-divinylbenzene copolymer core and a $Cr(OH)_3$ shell.

Example 2-24 to Example 2-25

Polymer-metal compound coated spherical particles of Example 2-24 to Example 2-25 were prepared in the same manner as in Example 2-23, except for using components and conditions listed in Table 1-4.

As shown in Example 2-1 to Example 2-25, the thickness of the coated shell layers could be altered by suitably adjusting the reactant concentrations. These composite particles of the present invention have an outer diameter of 0.07 to 30 $\mu$m and a ratio of core diameter to the outer diameter of 0.45 to 0.95. It is essential for many applications, such are catalyst, medical, ceramic, as electric, optical materials, etc. to have a variation of particle size and shell layer thickness in the composite particles.

Carbon-Metal Compound Composite Spherical Particles

Example 3-1

In a nitrogen gas atmosphere, 0.5 g of coated particles prepared in Example 2-6 having a styrene/DVB copolymer core and a $Y(OH)CO_3$ shell were heated from room temperature to 500° C. at a rate of 10° C. per minute, and kept at 500° C. for 3 hours, followed by cooling to room temperature at a rate of 20° C. per minute. The carbon-metal compound composite spherical particles thus obtained had an average particle size of 0.27 μm and a ratio of the core diameter to the outer diameter of 0.76. The particles were analyzed in the same manner as in Example 2-1 to confirm that the core was carbon and the shell consisted of $Y_2O_2CO_3$ or $Y_2O(CO_3)_2$. The data concerning the carbon-metal compound composite particles are given in Table 2.

Example 3-2 to Example 3-11

Carbon-metal compound composite particles of Examples 3-2 to 3-11 were prepared in the same manner as in Example 3-1 from polymer-metal compound composite spherical particles under the varying conditions; the rate of temperature rise, heating temperature, and heating time, and inert gas atmospheres, listed in Table 2.

The thickness of shell layer of these carbon-metal compound composite particles could be altered by using the polymer-metal composite particles of different ratios of the core diameter to the outer diameter. These composite particles of the present invention have an outer diameter of 0.05 to 20 μm and a ratio of the core diameter to the outer diameter of 0.30 to 0.93.

As shown in Example 3-1 to Example 3-5, carbon-metal composite particles with the shell of different composition can be obtained by altering the heating temperature. It is very useful to prepare for different application either amorphous or crystalline shells of metal compounds.

Hollow Particles

Example 4-1

0.3 g of coated particles prepared in Example 2-1 having a styrene copolymer core and a $Y(OH)CO_3$ shell were heated in an air atmosphere from room temperature to 800° C. at a rate of 10° C. per minute, and kept at 800° C. for 3 hours, followed by cooling to room temperature at a rate of 20° C. per minute. The hollow spherical particles thus obtained had an average particle size of 0.2 μm and a ratio of the core diameter to the outer diameter the core diameter of 0.60. The powder was analyzed in the same manner as in Example 2-1 to confirm that the particles were hollow and that the shell consisted of $Y_2O_3$. The data concerning the hollow particles are given in Table 3.

Example 4-2 to Example 4-12

Hollow particles of Examples 4-2 to 4-12 were prepared in the same manner as in Example 4-1 from polymer-metal compound composite spherical particles under the varying conditions; the rate of temperature rise, heating temperature, and heating time, and atmospheres, given in Table 3.

The thickness of shell layer of the hollow metal compound particles can be altered by selecting the polymer-metal composite particles with different ratios of the core diameter to outer diameter.

These hollow metal compound particle of the present invention have an outer diameter of 0.04 to 15 μm and ratio of the core diameter to the outer diameter of 0.3 to 0.93.

These hollow metal compound particle can be obtained either in amorphous or crystalline form by altering the heating temperature. Heating and cooling rate is strongly affected by the shell condition of the hollow metal compound particles. In case of high heating and cooling rate, the hollow metal compound particle may crack.

Obviously, numerous modifications and variations of the present invention are possible in light of the above teachings. It is therefore to be understood that within the scope of the appended claims, the invention may be practiced otherwise than as specifically described herein.

TABLE 1-1

| Example 2-1 | | Example 2-2 | Example 2-3 | Example 2-4 | Example 2-5 | Example 2-6 |
| --- | --- | --- | --- | --- | --- | --- |
| Core polymer (prepared in) | Example 1-1 | Example 1-1 | Example 1-1 | Example 1-1 | Example 1-2 | Example 1-3 |
| Tg (°C.) | 101 | 101 | 101 | 101 | 108 | 150< |
| Weight average M.W. | 95,000 | 95,000 | 95,000 | 95,000 | 130,000 | 850,000 |
| Amount (g/l) | 0.1 | 0.1 | 0.1 | 0.025 | 0.1 | 0.2 |
| Metal salt | $Y(NO_3)_3$ | $Y(NO_3)_3$ | $Y(NO_3)_3$ | $Y(NO_3)_3$ | $Y(NO_3)_3$ | $Y(NO_3)_3$ |
| Amount (mol/l) | $5.0 \times 10^{-3}$ | $1.25 \times 10^{-3}$ | $1.5 \times 10^{-3}$ | $2.5 \times 10^{-3}$ | $5.0 \times 10^{-3}$ | $1.0 \times 10^{-3}$ |
| Dispersing agent Amount (wt. %) | PVP (30) | PVP (5) | PVA (50) | SDS (10) | DBS (50) | PVP (20) |
| pH Controlling agent | Urea (1.8) | Urea (1.8) | Urea (1.8) | Urea (2.4) | FA (2.0) | Urea (1.2) |
| Hydrolysis conditions | | | | | | |
| Temperature (°C.) | 90 | 90 | 90 | 85 | 95 | 85 |
| Time (hour) | 2 | 2 | 4 | 6 | 3 | 3 |
| Particles | | | | | | |
| Average size (μm) | 0.26 | 0.20 | 0.34 | 0.28 | 0.21 | 0.30 |
| Ratio of core/shell diameter | 0.65 | 0.85 | 0.50 | 0.61 | 0.67 | 0.83 |
| Shapes | Perfect sphere | Perfect sphere | Perfect sphere | Perfect sphere | Perfect sphere | Perfect sphere |
| Compositions | | | | | | |
| Core | Sytrene | Sytrene | Sytrene | Sytrene | MMA/VC | Sytrene/DVB |
| Shell | $Y(OH)CO_3$ | $Y(OH)CO_3$ | $Y(OH)CO_3$ | $Y(OH)CO_3$ | $Y(OH)CO_3$ | $Y(OH)CO_3$ |

TABLE 1-2

|  | Example 2-7 | Example 2-8 | Example 2-9 | Example 2-10 | Example 2-11 | Example 2-12 | Example 2-13 |
|---|---|---|---|---|---|---|---|
| Core polymer (prepared in) | Example 1-4 | Example 1-5 | Example 1-6 | Example 1-7 | Example 1-8 | Example 1-3 | Example 1-10 |
| Tg (°C.) | 75 | 150< | 150< | 105 | 150< | 150< | −18 |
| Weight average M.W. | 5,500 | 1,000,000 | 1,000,000 | 700,000 | 1,000,000< | 850,000 | 1,000,000< |
| Amount (g/l) | 0.1 | 0.1 | 0.1 | 0.05 | 0.1 | 0.2 | |
| Metal salt | YCl$_3$ | Y(NO$_3$)$_3$ | Y(NO$_3$)$_3$ | Y(NO$_3$)$_3$ | Y(NO$_3$)$_3$ | Y(NO$_3$)$_3$ | Y(NO$_3$)$_3$ |
| Amount (mol/l) | $5.0 \times 10^{-3}$ | $5.0 \times 10^{-3}$ | $5.0 \times 10^{-3}$ | $2.5 \times 10^{-3}$ | $1.0 \times 10^{-3}$ | $5.0 \times 10^{-3}$ | $1.0 \times 10^{-3}$ |
| Dispersing agent | PVP (100) | PVP (50) | PVP (200) | PVP (10) | PVP (10) | PVP (50) | |
| Amount (wt. %) | SDS (30) | | DBS (50) | SDS (10) | SDS (10) | SDS (10) | SDS (100) |
| pH Controlling agent Amount (mol/l) | Urea (0.9) | Urea (2.0) | FA (1.0) Urea (1.0) | Urea (1.2) | Urea (1.5) | Urea (0.8) | Urea (1.5) |
| Hydrolysis conditions | | | | | | | |
| Temperature (°C.) | 90 | 90 | 95 | 90 | 80 | 90 | 85 |
| Time (hour) | 4 | 3 | 2 | 2 | 8 | 3 | 4 |
| Particles | | | | | | | |
| Average size (μm) | 0.28 | 0.40 | 0.38 | 3.7 | 21.5 | 0.3 | 0.32 |
| Ratio of core/shell diameter | 0.68 | 0.88 | 0.81 | 0.84 | 0.93 | 0.83 | 0.78 |
| Shapes | Sphere | Perfect sphere | Perfect sphere | Sphere | Sphere | Sphere | Perfect sphere |
| Compositions | | | | | | | |
| Core | Sytrene | Styrene/DBV | Styrene/DBV, m-EVB | Styrene | Styrene/DBV | Sytrene/DBV | Sytrene/BD |
| Shell | Y(OH)CO$_3$ | Y(OH)CO$_3$ | Y(OH)CO$_3$ | Y(OH)CO$_3$ | Y(OH)CO$_3$ | Y(OH)CO$_3$ | Y(OH)CO$_3$ |

TABLE 1-3

|  | Example 2-14 | Example 2-15 | Example 2-16 | Example 2-17 | Example 2-18 | Example 2-19 |
|---|---|---|---|---|---|---|
| Core polymer (prepared in) | Example 1-3 | Example 1-5 | Example 1-1 | Example 1-9 | Example 1-1 | Example 1-1 |
| Tg (°C.) | 150< | 150< | 101 | 102< | 101 | 101 |
| Weight average M.W. | 850,000 | 1,000,000< | 95,000 | 750,000 | 95,000 | 95,000 |
| Amount (g/l) | 0.1 | 0.06 | 0.1 | 0.2 | 0.1 | 0.1 |
| Metal salt | Zr(SO$_4$)$_2$ | Zr(SO$_4$)$_2$ | Zr(SO$_4$)$_2$ | Zr(SO$_4$)$_2$ | Zr(SO$_4$)$_2$ | Zr(SO$_4$)$_2$ |
| Amount (mol/l) | $5.0 \times 10^{-3}$ | $5.0 \times 10^{-3}$ | $3.0 \times 10^{-3}$ | $1.0 \times 10^{-3}$ | $1.0 \times 10^{-3}$ | $1.0 \times 10^{-3}$ |
| Dispersing agent Amount (wt. %) | PVA (300) | PVP (50) SDS (10) | PVP (50) SDS (10) | PVP (50) SDS (10) | PVP (300) | PVP (300) |
| pH Controlling agent Amount (mol/l) | FA (1.0) | FA (0.7) | FA (0.7) | FA (1.5) | Urea (1.8) | Urea (1.8) |
| Hydrolysis conditions | | | | | | |
| Temperature (°C.) | 70 | 70 | 75 | 70 | 50 | 50 |
| Time (hour) | 2 | 3 | 2 | 2 | 5 | 5 |
| Particles | | | | | | |
| Average size (μm) | 0.31 | 0.45 | 0.23 | 0.49 | 0.22 | 0.41 |
| Ratio of core/shell diameter | 0.81 | 0.78 | 0.74 | 0.84 | 0.77 | 0.40 |
| Shapes | Sphere | Sphere | Sphere | Sphere | | |
| Compositions | | | | | | |
| Core | Styrene/DBV | Styrene/DBV | Styrene | Styrene/AN | Styrene | Styrene |
| Shell | Zr$_2$(OH)$_6$SO$_4$ | Zr$_2$(OH)$_6$SO$_4$ | Zr$_2$(OH)$_6$SO$_4$ | Zr$_2$(OH)$_6$SO$_4$ | Zr$_2$(OH)$_6$SO$_4$ | Zr$_2$(OH)$_6$SO$_4$ |

TABLE 1-4

|  | Example 2-20 | Example 2-21 | Example 2-22 | Example 2-23 | Example 2-24 | Example 2-25 |
|---|---|---|---|---|---|---|
| Core polymer (prepared in) | Example 1-1 | Example 1-6 | Example 1-1 | Example 1-6 | Example 1-1 | Example 1-1 |
| Tg (°C.) | 101 | 150< | 101 | 150< | 101 | 101 |
| Weight average M.W. | 95,000 | 1,000,000 | 95,000 | 1,000,000< | 95,000 | 95,000 |
| Amount (g/l) | 0.2 | 0.15 | 0.1 | 0.2 | 0.1 | 0.03 |
| Metal salt | Al(NO$_3$)$_3$ | Al(NO$_3$)$_3$ | Al(NO$_3$)$_3$ | Chrom-Alum | Chrom-Alum | Chrom-Alum |
| Amount (mol/l) | 0.1 Al$_2$(SO$_4$)$_3$ 0.05/Preheat 2 hr | 0.05 Al$_2$(SO$_4$)$_3$ 00.02/Preheat 2 hr | 0.02 Al$_2$(SO$_4$)$_3$ 0.01/Preheat 2 hr | $1.0 \times 10^{-3}$ | $1.0 \times 10^{-2}$ | $5.0 \times 10^{-4}$ |
| Dispersing agent Amount (wt. %) | PVP (30) | DBS (100) | PVP (100) | PVP (300) | PVP (50) | PVP (100) |
| pH Controlling agent Amount (mol/l) | Urea (0.5) | Urea (0.3) | Urea (0.5) | — | — | — |
| Hydrolysis conditions | | | | | | |
| Temperature (°C.) | 25 | 25 | 25 | 85 | 85 | 85 |
| Time (hour) | 0.5 | 0.5 | 0.5 | 6 | 6 | 8 |
| Particles | | | | | | |
| Average size (μm) | 0.28 | 0.42 | 0.22 | 0.40 | 0.34 | 0.21 |
| Ratio of core/shell diameter | 0.61 | 0.74 | 0.77 | 0.78 | 0.50 | 0.81 |
| Shapes | Sphere | Sphere | Sphere | Sphere | Sphere | Sphere |

TABLE 1-4-continued

|  | Example 2-20 | Example 2-21 | Example 2-22 | Example 2-23 | Example 2-24 | Example 2-25 |
|---|---|---|---|---|---|---|
| Compositions | | | | | | |
| Core | Styrene | DVB | Styrene | Styrene/DVB | Styrene | Styrene |
| Shell | Al(OH)$_3$ | Al(OH)$_3$ | Al(OH)$_3$ | Cr(OH)$_3$ | Cr(OH)$_3$ | Cr(OH)$_3$ |

TABLE 2-1

|  | Example 3-1 | Example 3-2 | Example 3-3 | Example 3-5 | Example 3-4 |
|---|---|---|---|---|---|
| Polymer-metal particles (prepared in) | Example 2-6 | Example 2-9 | Example 2-5 | Example 2-17 | Example 2-11 |
| Core polymer | Styrene/DVB = 91/1 | m-EVB/ DVB = 20/80 | MMA/VC/AA/ DVB = 85/10/3/2 | AN/ST/AA/DVB = 60/35 | Styrene/DVB 4/1 |
| Crosslinking monomer (wt. %) | DVB 1.0 | DVB 80 | DVB 2 | DVB 1 | DVB 1.0< |
| Shell-compound | Y(OH)CO$_3$ | Y(OH)CO$_3$ | Y(OH)CO$_3$ | Zr(OH)$_4$ | Y(OH)CO$_3$ |
| Average size (μm) | 0.30 | 0.38 | 0.21 | 0.49 | 21.5 |
| Ratio of core/shell diameter | 0.83 | 0.81 | 0.67 | 0.84 | 0.93 |
| Conditions | | | | | |
| Inert gas | N$_2$ | N$_2$ | N$_2$ | N$_2$ | N$_2$ |
| Heating rate (°C./min) | 10 | 20 | 10 | 10 | 5 |
| Heating temp. (°C.) | 500 | 700 | 450 | 450 | 480 |
| Heating time (hour) | 3 | 4 | 5 | 4 | 6 |
| Cooling rate (°C./min) | 20 | 20 | 20 | 20 | 5 |
| Particles | | | | | |
| Average size (μm) | 0.27 | 0.32 | 0.15 | 0.39 | 17.8 |
| Ratio of core/shell diameter | 0.76 | 0.88 | 0.53 | 0.77 | 0.84 |
| Shapes | Sphere | Sphere | Sphere | Sphere | Sphere |
| Compositions | | | | | |
| Core | Carbon | Carbon | Carbon | Carbon | Carbon |
| Shell | Y$_2$O$_2$CO$_3$ Y$_2$O(CO$_3$)$_2$ | Y$_2$O$_3$ | Y$_2$O$_2$CO$_3$ Y$_2$O(CO$_3$)$_2$ | Zr$_2$O$_3$SO$_4$ | Y$_2$O$_2$CO$_3$ Y$_2$O(CO$_3$)$_2$ |

TABLE 2-2

|  | Example 3-6 | Example 3-7 | Example 3-8 |
|---|---|---|---|
| Polymer-metal particles (prepared in) | Example 2-15 | Example 2-21 | Example 2-23 |
| Core polymer | Styrene/DVB = 90/10 | m-EVB/DVB = 20/80 | m-EVB/DVB = 20/80 |
| Crosslinking monomer (wt. %) | DVB 10 | DVB 80 | DVB 80 |
| Shell-compound | Zr(OH)$_4$ | Al(OH)$_3$ | Cr(OH)$_3$ |
| Average size (μm) | 0.45 | 0.42 | 0.40 |
| Ratio of core/shell diameter | 0.78 | 0.74 | 0.78 |
| Conditions | | | |
| Inert gas | Argon | N$_2$ | N$_2$ |
| Heating rate (°C./min) | 5 | 10 | 10 |
| Heating temp. (°C.) | 800 | 500 | 700 |
| Heating time (hour) | 4 | 3 | 3 |
| Cooling rate (°C./min) | 20 | 20 | 20 |
| Particles | | | |
| Average size (μm) | 0.37 | 0.35 | 0.35 |
| Ratio of core/shell diameter | 0.73 | 0.66 | 0.63 |
| Shapes | Sphere | Sphere | Sphere |
| Compositions | | | |
| Core | Carbon | Carbon | Carbon |
| Shell | ZrO$_2$ | Al(OH)$_3$ Al$_2$O$_3$ | Cr$_2$O$_3$ |

TABLE 3-1

|  | Example 4-1 | Example 4-2 | Example 4-3 | Example 4-4 | Example 4-5 |
|---|---|---|---|---|---|
| Polymer-metal particles (prepared in) | Example 2-1 | Example 2-1 | Example 2-10 | Example 2-16 | Example 2-20 |
| Core polymer | Styrene | Styrene | Styrene | Styrene | Styrene |
| Crosslinking monomer (wt. %) | — | — | — | — | — |
| Shell-compound | Y(OH)CO$_3$ | Y(OH)CO$_3$ | Y(OH)CO$_3$ | Zr$_2$(OH)$_6$SO$_4$ | Al(OH)$_3$ |
| Average size (μm) | 0.26 | 0.26 | 3.7 | 0.23 | 0.28 |
| Ratio of core/shell diameter | 0.65 | 0.65 | 0.84 | 0.74 | 0.61 |

TABLE 3-1-continued

|  | Example 4-1 | Example 4-2 | Example 4-3 | Example 4-4 | Example 4-5 |
|---|---|---|---|---|---|
| Conditions |  |  |  |  |  |
| Atmosphere | Air | Air | Air | Air | Air |
| Heating rate (°C./min) | 10 | 10 | 10 | 20 | 20 |
| Heating temp. (°C.) | 800 | 550 | 900 | 1000 | 1100 |
| Heating time (hour) | 3 | 3 | 2 | 4 | 3 |
| Cooling rate (°C./min) | 20 | 20 | 20 | 20 | 20 |
| Particles |  |  |  |  |  |
| Average size (μm) | 0.2 | 0.22 | 2.9 | 0.17 | 0.20 |
| Ratio of core/shell diameter | 0.60 | 0.59 | 0.72 | 0.63 | 0.55 |
| Shapes | Sphere | Sphere | Sphere | Sphere | Sphere |
| Compositions |  |  |  |  |  |
| Core | Hollow | Hollow | Hollow | Hollow | Hollow |
| Shell | $Y_2O_3$ | $Y_2O_2CO_3$ $Y_2O(CO_3)_2$ | $Y_2O_3$ | $ZrO_2$ | $Al_2O_3$ |

TABLE 3-1

|  | Example 4-6 | Example 4-7 | Example 4-8 |
|---|---|---|---|
| Polymer-metal particles (prepared in) | Example 2-22 | Example 2-24 | Example 2-25 |
| Core polymer | Styrene | Styrene | Styrene |
| Crosslinking monomer (wt. %) |  |  |  |
| Shell-compound | $Al(OH)_3$ | $Cr(OH)_3$ | $Cr(OH)_3$ |
| Average size (μm) | 0.22 | 0.34 | 0.21 |
| Ratio of core/shell diameter | 0.77 | 0.50 | 0.81 |
| Conditions |  |  |  |
| Atmosphere | Oxygen | Air | Air |
| Heating rate (°C./min) | 10 | 10 | 10 |
| Heating temp. (°C.) | 900 | 800 | 800 |
| Heating time (hour) | 4 | 3 | 4 |
| Cooling rate (°C./min) | 10 | 10 | 15 |
| Particles |  |  |  |
| Average size (μm) | 0.17 | 0.26 | 0.17 |
| Ratio of core/shell diameter | 0.76 | 0.46 | 0.71 |
| Shapes | Sphere | Sphere | Sphere |
| Compositions |  |  |  |
| Core | Hollow | Hollow | Hollow |
| Shell | $Al(OH)_3$ | $Cr_2O_3$ | $Cr_2O_3$ |

What is claimed is:

1. A process for preparing substantially unagglomerated spherical polymer-metal compound coated particles comprising:
   homogeneously dispersing particles of a polymeric compound in an aqueous solution of a hydrolyzable metal salt and forming by heterocoagulation a uniform layer of a metal compound on the surfaces of particles of the polymeric compound,
   said spherical polymer-metal compound coated particles comprising:
   (a) a core of a polymeric compound, and (b) a shell of a metal compound covering the polymeric compound core, said composite particles having an outer diameter of 0.07 to 30 μm and a ratio of the core diameter to the outer diameter of 0.40 to 0.95.

2. A process according to claim 1, further comprising adding ga water soluble polymeric compound or a surface active agent, or both, in an amount of 1.0% by weight or more of said polymeric compound, to said dispersion of particles of a polymeric compound in the aqueous solution of a hydrolyzable metal salt.

3. A process according to claim 2, wherein said water soluble polymeric compound or said surfactant is selected from the group consisting of polyvinyl pyrrolidone, polyvinyl alcohol, sodium hexamethaphosphate, sodium polycarboxylate, sodium naphthalene sulfonate, sodium dodecylbenzene sulfonate, and sodium dodecyl sulfate.

4. A process according to claim 3, the surface charge of polymer compound in an aqueous solution being positive or neutral.

5. The process of claim 1, further comprising a step of hydrolyzing the metal salt.

6. A process for preparing substantially unagglomerated spherical carbon-metal compound composite particles containing (a) a carbon core, and (b) a shell of a metal compound covering the carbon core, said coated particles having an outer diameter of 0.05 to 20 μm and a ratio of the core diameter to the outer diameter of 0.30 to 0.93 comprising: heating spherical polymer-metal compound coated particles at a temperature of 150° C. or higher under an inert gas atmosphere to decompose the polymeric compound of the core into carbon,
   said spherical polymer-metal compound coated particles comprising:
   (a) a core of a polymeric compound uniformly, and
   (b) a shell of a metal compound covering the polymeric compound core, said composite particles having an outer diameter of 0.07 to 30 μm and a ratio of the core diameter to the outer diameter of 0.40 to 0.95.

7. A process according to claim 6, wherein the polymeric compound constituting the core of said spherical polymer-metal compound coated particles contains at least 0.5% by weight of crosslinking monomer.

8. A process according to claim 7, wherein said polymeric compound contains at least 20% by weight of monomer selected from styrene, methylmethacrylate, acrylonitrile, and butadiene.

9. A process according to claim 7, wherein said crosslinking monomer is divinylbenzene.

10. A process according to claim 7, wherein the heating of the spherical polymer-metal compound coated particles is carried out at a temperature above 300° C.

11. A process of claim 6, wherein said metal compound shell comprise a compound selected from the group consisting of yttrium, aluminum, zirconium and chromium compounds.

12. A process of claim 11, wherein the compounds are metal oxides.

13. A process for preparing substantially unagglomerated spherical hollow particles having an outer diameter of 0.04 to 15 μm and a ratio of the hollow sphere diameter to the particle diameter of 0.30 to 0.93 comprising: heating spherical polymer-metal compound coated particles at a temperature of 150° C. or higher in the presence of oxygen to completely decompose the polymeric compound into gas and allowing the gas to pass through the shell, said spherical polymer-metal compound coated particles comprising:
(a) a core of a polymeric compound uniformly, and
(b) a shell of a metal compound uniformly covering the polymeric compound core, said composite particles having an outer diameter of 0.07 to 30 μm and a ratio of the core diameter to the outer diameter of 0.40 to 0.95.

14. A process according to claim 13, wherein the polymeric compound constituting the core of said spherical polymer-metal compound coated particles do not contain crosslinking monomer.

* * * * *